Patented Nov. 30, 1926.

1,608,622

UNITED STATES PATENT OFFICE.

JOHN G. SCHMIDT, OF MILWAUKEE, AND HENRY R. LEE, OF SOUTH MILWAUKEE, WISCONSIN, ASSIGNORS TO THE NEWPORT COMPANY, A CORPORATION OF DELAWARE.

PROCESS FOR PREVENTING THE DISSOLUTION OF IRON AND STEEL IN SULPHURIC ACID AND PICKLING BATHS.

No Drawing. Application filed September 30, 1925. Serial No. 59,740.

This invention relates to a process for substantially preventing the dissolution of iron and steel in sulphuric acid and is particularly adapted for preventing excessive dissolution of iron and steel in pickling baths or for preventing the corrosion of iron and steel containers, such as tank cars, which are used in storing or transporting sulphuric acid.

In the pickling process, iron and steel sheet, wire and other products derived from iron and steel, which have become coated with a scale of iron oxide during the process of manufacture are submitted to treatment with dilute sulphuric acid in order to remove the scale. The complete removal of the scale of oxide is necessary before a finishing process, such as galvanizing, painting and the like can be applied.

The action of sulphuric acid in the pickling bath is to dissolve the scale, but unless the article treated is removed from the pickling bath at the instant when the scale is completely dissolved, further solvent action takes place on the metal itself, causing pitting and roughening of the surface. This secondary action greatly depreciates the value of the finished product.

The transportation of sulphuric acid in iron and steel tank cars is not entirely satisfactory for the reason that sulphuric acid in dilute and moderate concentrations attacks iron and steel very readily. The concentration of sulphuric acid, therefore, that may be economically transported in iron and steel tank cars is restricted to the higher strengths of acid.

It is therefore an object of this invention to provide means whereby the action of sulphuric acid of lower concentration upon iron and steel products is very greatly retarded.

It is a further object of this invention to provide means whereby the substantial prevention of the dissolution of iron and steel products, after the removal of the scale of oxide therefrom in pickling baths, may be accomplished.

It is a further important object of this invention to provide means for preventing the corrosion of iron and steel tank cars and other containers used in storing and transporting sulphuric acid of dilute and moderate concentrations.

Other and further objects of this invention will be apparent from the description in the following specification:

We have discovered that thio-urea and especially its substitution products have the property of inhibiting or minimizing the solvent action of sulphuric acid or acid sulphates in solution on iron and steel. While thio-urea itself exhibits this property to a limited degree, we have further found that its substitution products are much more satisfactory. Said substitution products may include all compounds having the general structure:

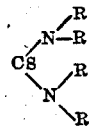

in which R represents a hydrogen, alphyl or aryl radical. Any or all of the hydrogen atoms of the amino groups in thio-urea may be replaced by a radical of the aliphatic or aromatic series, such as methyl, ethyl, benzyl, phenyl and the like. These thiourea substitution products act to minimize the solvent action of sulphuric acid of any concentration up to about 90% $H_2SO_4$, as well as of solutions of acid sulphate salts. At the lower concentrations the inhibiting action of the thio-urea compounds is most marked.

Where sheet sheet, steel wire or other steel products are pickled in a sulphuric acid bath prior to galvanizing, painting or other finishing processes, the following example will demonstrate the advantage of using thio-ureas to prevent the dissolution of metal.

Example 1.

A weighed piece of steel sheet 4" by 1" by 1/8" was placed in a pickling bath consisting of 600 grams of 15% sulphuric acid and 100 milligrams of ditolyl thio-urea. This bath was heated for 15 minutes at 80° C, the plate then removed, washed free of acid, weighed, and dried. The loss of metal was at the rate of 203.5 mg. per sq. inch per 24 hours and the surface of the metal remained clean and bright. A sheet of metal of like size and weight when treated in a similar way in a bath containing no thio-urea lost weight at the rate of 31.858 grams per square inch per 24 hours and the surface became rough and pitted. The loss of iron in this case was 156.6 times as rapid when no inhibitor was added. Similarly, where it is desirable to remove zinc from galvanized iron a small addition of thio urea or its derivatives to the bath will permit the removal of the zinc without appreciably attacking the iron.

Where it is desirable to ship or store sulphuric acid in concentrations up to 90% sulphuric acid a small addition of the above mentioned thio ureas has been found to minimize the action of sulphuric acid on steel and greatly prolong the life of the container.

*Example II.*

A weighed container of sheet steel was filled with 40% sulphuric acid containing 1 part of di-xylyl thio-urea to 6000 parts of sulphuric acid of the above strength. After standing for a period of seven days at room temperature the container was emptied, washed free of acid, dried and reweighed. The loss of iron was found to be 3.98 mg. per sq. inch per day. A container of similar weight and volume when filled with 40% sulphuric acid containing no thio-urea and allowed to stand for a like period of time showed a loss of weight of 427 mg. per square inch per day. The loss of iron in this case was 107 times as rapid as when no thio-urea was added. Expressed in other terms, the life of a container 1/8" thick when filled with 40% sulphuric acid without the addition of this inhibitor would be 11.5 days, whereas the life of the container where 1 part of inhibitor to 6000 parts of acid is added would be 3 years and 4 months.

In place of sulphuric acid, solutions of acid sulphates such as sodium bisulphate may be substituted with equally satisfactory results.

*Example III.*

A weighed piece of sheet steel was placed in a pickling bath consisting of 500 c. c. of 12.5% by weight of sodium bisulphate and 100 mg. of ditolyl thiourea. The bath was heated for 1 hour at 80° C., the plate then removed, washed free of acid, and dried. The loss in weight was 2.16 mg. per sq. inch per hour. A check experiment where no thiourea was added showed a loss of 327 mg. per sq. inch per hour. Expressed in other terms, the loss was 151.5 times as great where no inhibitor was added.

We are aware that numerous details of the process may be varied through a wide range without departing from the spirit of this invention, and we do not desire limiting the patent granted other than as necessitated by the prior art.

We claim as our invention:

1. A process for substantially preventing the dissolution of iron and steel in sulphuric acid which consists in adding thio-urea and its substitution products to the sulphuric acid.

2. A process for substantially preventing the dissolution of iron and steel in sulphuric acid of less than 90% sulphuric acid content, which consists in adding thio-urea and its substitution products to the sulphuric acid.

3. A process for substantially preventing the dissolution of iron and steel in sulphuric acid of less than 90% sulphuric acid content, which consists in adding to the acid a compound having the general formula

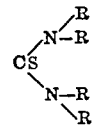

in which R represents a hydrogen, alphyl or aryl radical.

4. A process for substantially preventing the dissolution of iron and steel in sulphuric acid of less than 90% sulphuric acid content, which consists in adding an aromatic substituted thio-urea to the sulphuric acid.

5. A process for substantially preventing the dissolution of iron and steel in sulphuric acid of less than 90% sulphuric acid content, which consists in adding ditolyl thio-urea to the sulphuric acid.

6. A process for substantially preventing the dissolution of iron and steel in sulphuric acid of less than 90% sulphuric acid content, which consists in adding less than 1 per cent by weight of the acid of thio-urea and its substitution products to the sulphuric acid.

7. A process for substantially preventing the dissolution of iron and steel in sulphuric acid of less than 90% sulphuric acid content, which consists in adding less than 1 per cent by weight of the acid of di-tolyl thio-urea.

8. A process for substantially preventing the dissolution of iron and steel in solutions having an acidity due to the presence therein of the constituent ions of sulphuric acid by the addition to said solutions of thiourea and its substitution products.

9. A process for substantially preventing the dissolution of iron and steel in solutions having an acidity due to the presence therein of the constituent ions of sulphuric acid by the addition to said solutions of di-tolyl thio-urea.

10. The process of pickling iron and steel products, which consists in bringing said products into a bath containing sulphuric acid and a thio-urea body.

11. A pickling bath for iron and steel products, comprising sulphuric acid containing a thio-urea body.

12. A substantially non-iron dissolving solution, comprising sulphuric acid containing less than 1% by weight of thio-urea.

13. A substantially non-iron dissolving solution, comprising sulphuric acid containing less than 1% by weight of ditolyl thio-urea.

In testimony whereof we have hereunto subscribed our names.

JOHN G. SCHMIDT.
HENRY R. LEE.